(12) United States Patent
Peterson et al.

(10) Patent No.: US 11,772,578 B2
(45) Date of Patent: Oct. 3, 2023

(54) PLASTIC VEHICLE BODY COMPONENTS AND RELATED ATTACHMENT METHOD

(71) Applicant: Honda Motor Co., Ltd., Tokyo (JP)

(72) Inventors: Michael V. Peterson, Marysville, OH (US); Stephen Frericks, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/244,289

(22) Filed: Apr. 29, 2021

(65) Prior Publication Data
US 2022/0348151 A1 Nov. 3, 2022

(51) Int. Cl.
*B60R 13/04* (2006.01)
*B62D 65/16* (2006.01)
*B60R 19/18* (2006.01)

(52) U.S. Cl.
CPC ........... *B60R 13/04* (2013.01); *B62D 65/16* (2013.01); *B60R 2019/1886* (2013.01)

(58) Field of Classification Search
CPC ......... B60R 13/04; B60R 19/44; B60R 19/52; B60R 19/54; B60R 2019/247; B60R 2019/1886; B62D 25/16; B62D 25/163; B62D 65/16
USPC ........................................................ 296/198
See application file for complete search history.

(56) References Cited

U.S. PATENT DOCUMENTS

| | | | |
|---|---|---|---|
| 4,274,667 A * | 6/1981 | Dietmar | B60R 19/24 296/187.11 |
| 5,226,695 A * | 7/1993 | Flint | B62D 29/048 293/121 |
| 6,171,543 B1 | 1/2001 | Hirose | |
| 6,979,054 B2 | 12/2005 | Yamamoto et al. | |
| 7,083,844 B2 | 8/2006 | Yamamoto | |
| 7,159,933 B2 | 1/2007 | Yamamoto | |
| 7,344,331 B2 | 3/2008 | Kobayashi et al. | |
| 7,540,550 B1 * | 6/2009 | Huber | B60R 19/24 296/29 |
| 7,806,467 B2 | 10/2010 | Sangu | |
| 8,297,646 B2 | 10/2012 | Aoki | |
| 9,862,334 B2 | 1/2018 | Mukhtar et al. | |
| 10,017,130 B2 | 7/2018 | Knieper | |
| 10,569,807 B2 | 2/2020 | Jeong et al. | |
| 11,492,048 B1 * | 11/2022 | Kowaczyk | B60R 13/04 |

(Continued)

FOREIGN PATENT DOCUMENTS

FR 2878206 5/2006

*Primary Examiner* — Gregory A Blankenship
(74) *Attorney, Agent, or Firm* — RANKIN, HILL & CLARK LLP

(57) ABSTRACT

A vehicle assembly includes a first body component and a second body component. The first body component has an exterior surface and an interior hidden surface, where the exterior surface has in part an aesthetic finish. The first body component defines a first connecting portion having a rib secured by the interior surface. The rib has a first opening formed therethrough. The second body component has an outward extended second connecting portion. A base wall of the second connecting portion has a second opening formed therethrough. The base wall abuts the rib with the second opening aligned with the first opening. A fastener is inserted through the first and second openings from within the second connecting portion.

19 Claims, 3 Drawing Sheets

(56) References Cited

U.S. PATENT DOCUMENTS

| | | | |
|---|---|---|---|
| 2002/0163216 A1* | 11/2002 | Delavalle | B62D 25/163 |
| | | | 296/29 |
| 2005/0062308 A1* | 3/2005 | Pfister | B62D 25/163 |
| | | | 296/29 |
| 2005/0241259 A1 | 11/2005 | Rijsbergen et al. | |
| 2006/0017311 A1* | 1/2006 | Suwa | B60R 19/24 |
| | | | 296/203.02 |
| 2006/0202517 A1* | 9/2006 | Pelini | B62D 25/08 |
| | | | 296/193.09 |
| 2009/0160218 A1* | 6/2009 | Onuma | B05B 13/0292 |
| | | | 296/191 |
| 2012/0292931 A1* | 11/2012 | Mizoguchi | B60R 19/24 |
| | | | 293/155 |
| 2013/0001982 A1* | 1/2013 | Ohba | B60J 5/101 |
| | | | 296/187.11 |
| 2013/0076070 A1* | 3/2013 | Ogawa | B60R 19/34 |
| | | | 296/187.11 |
| 2014/0084609 A1* | 3/2014 | Momii | B60R 19/24 |
| | | | 293/155 |
| 2015/0102638 A1* | 4/2015 | Neculau | B62D 27/06 |
| | | | 29/897.2 |
| 2018/0154753 A1* | 6/2018 | Katayama | B60R 13/04 |
| 2018/0257594 A1* | 9/2018 | Du | B60R 19/023 |
| 2019/0111858 A1* | 4/2019 | Xiong | F16B 21/086 |
| 2019/0322227 A1* | 10/2019 | Hiwatashi | B60R 13/04 |
| 2019/0366946 A1* | 12/2019 | Shinohara | F16B 5/0657 |
| 2020/0047677 A1* | 2/2020 | Keck, II | B60R 13/04 |
| 2022/0063532 A1* | 3/2022 | Kotake | B62D 27/023 |

\* cited by examiner

PLASTIC VEHICLE BODY COMPONENTS AND RELATED ATTACHMENT METHOD

BACKGROUND

A variety of injection molded parts are made and used for vehicle body and trim parts. These plastic parts can be attached using visible fasteners or hidden fasteners or a combination of both. The visible fasteners create an undesirable appearance. For the hidden fasteners, the plastic parts often have attachment means (for example, a doghouse structure or mounting rib) molded or formed on their back or hidden sides. However, the attachment means for the hidden fasteners can still create undesirable sink marks on an appearance surface of the plastic part.

BRIEF DESCRIPTION

According to one aspect, a vehicle assembly comprises a first body component and a second body component. The first body component has an exterior surface and an interior hidden surface, where the exterior surface has in part an aesthetic finish. The first body component defines a first connecting portion having a rib secured by the interior surface. The rib has a first opening formed therethrough. The second body component has an outward extended second connecting portion. A base wall of the second connecting portion has a second opening formed therethrough. The base wall abuts the rib with the second opening aligned with the first opening. A fastener is inserted through the first and second openings from within the second connecting portion.

According to another aspect, a vehicle assembly comprises a first body component and a second body component. The first body component has an exterior surface and an interior hidden surface, where the exterior surface has a main exterior surface section with an aesthetic finish. The interior surface has a main interior surface section opposite the main exterior surface section. The first body component defines a first connecting portion having a rib integral with the interior surface. The rib is spaced from and not in contact with the main interior surface section. The rib has a first opening formed therethrough. The second body component has an outward extended second connecting portion. A base wall of the second connecting portion has a second opening formed therethrough. The first connecting portion is configured to receive the second connecting portion with the base wall abutting the rib and the second opening aligned with the first opening. A fastener is inserted through the first and second openings from within the second connecting portion.

According to another aspect, a vehicle assembly method comprises providing a plastic first body component, the first body component includes a first connecting portion having an exterior surface and an interior hidden surface, the exterior surface has a main exterior surface section with an aesthetic finish, the interior surface has a main interior surface section opposite the main exterior surface section; integrally forming a rib on the first connecting portion of the first body component, the rib has a first opening formed therethrough, and spacing the rib from the main interior surface section such that the rib is not in contact with the main interior surface section; providing a plastic second body component having a second connecting portion extended outward from an exterior surface of the second body component, a base wall of the second connecting portion has a second opening formed therethrough; positioning the base wall immediately adjacent the rib such that the second opening is aligned with the first opening; and inserting a fastener through the first and second openings from within the second connecting portion.

DETAILED DESCRIPTION

Figure 1:
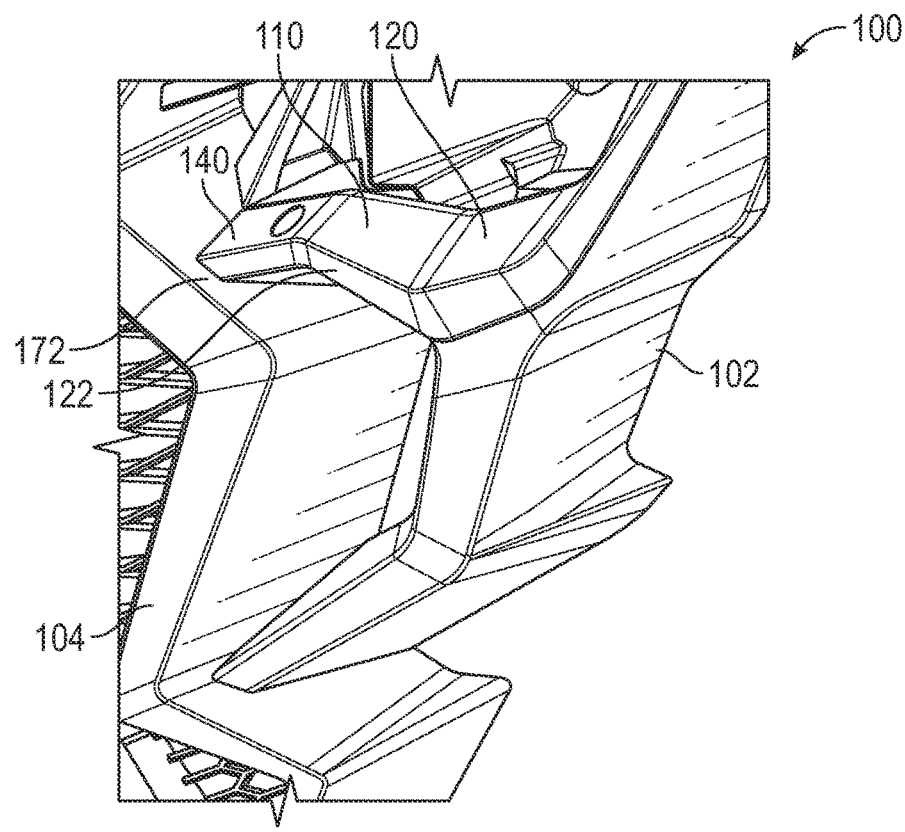
FIG. 1 is a partial perspective view of a vehicle assembly including a first body component attached to a second body component.
Figure 2:
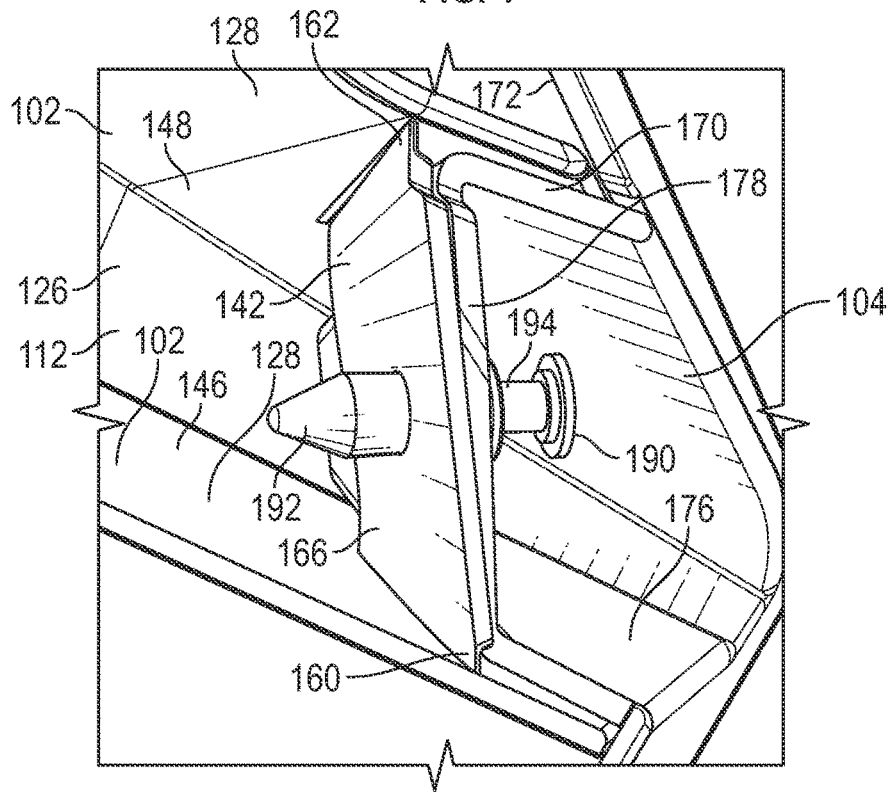
FIGS. 2, 3 and 4 are partial bottom perspective views of FIG. 1.
Figure 3:
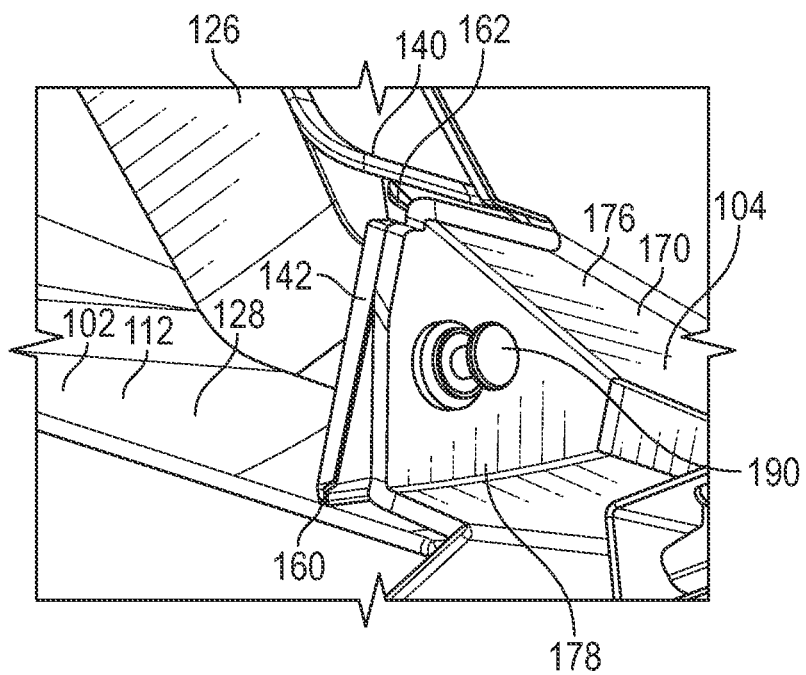
Figure 4:
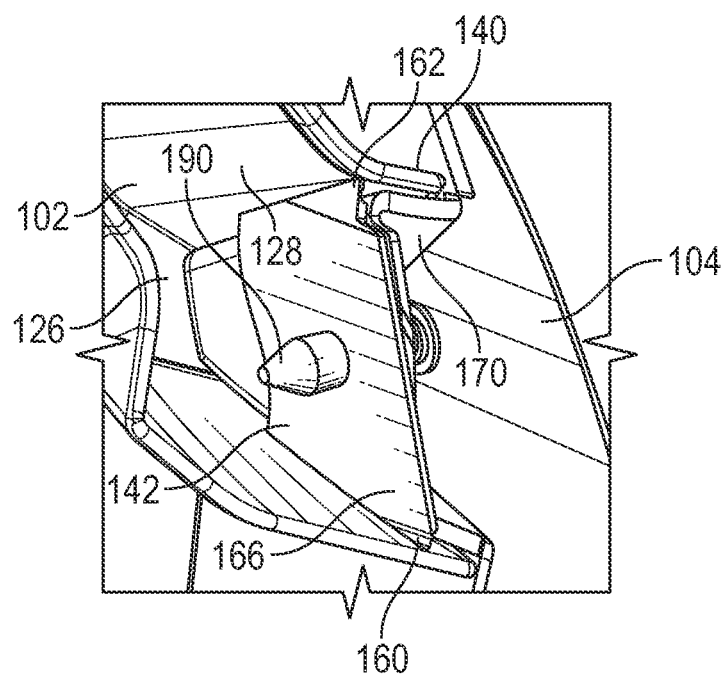
Figure 5:
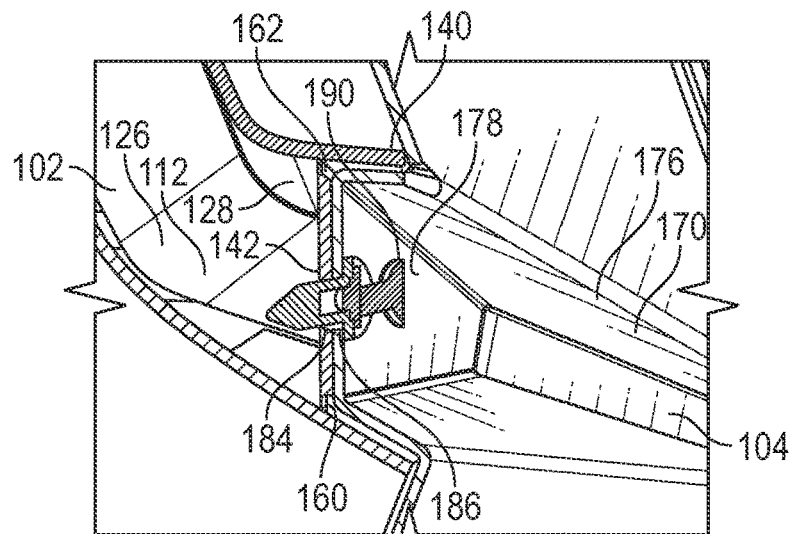
FIGS. 5, 6 and 7 are partial cross-sectional views of FIG. 1.
Figure 6:
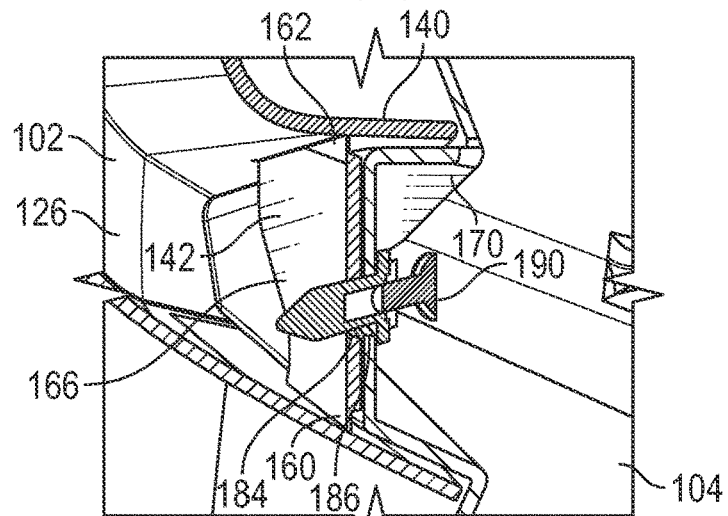
Figure 7:
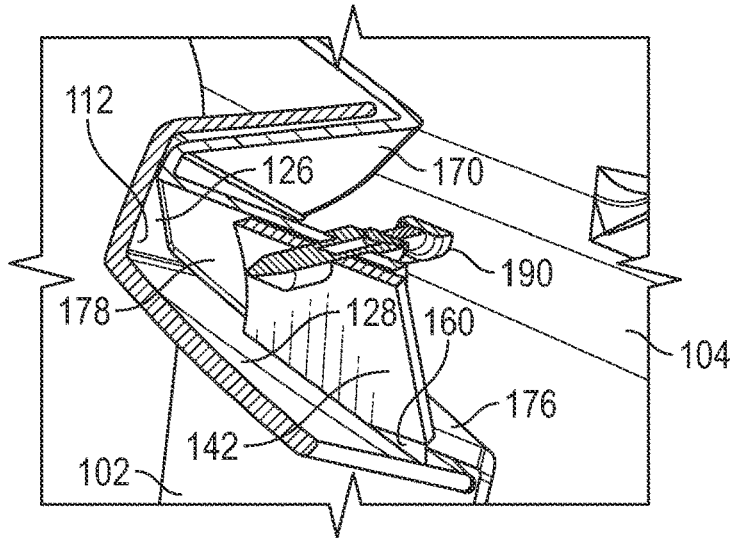

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-7 illustrate a vehicle assembly 100 according to the present disclosure comprising a first body component 102 and a second body component 104 attached to the first body component. The first and second body components 102, 104 can be any of the various trim components and/or garnish components in the vehicle assembly as is known in the vehicle art. The first body component 102 has an exterior surface 110 and an interior hidden surface 112, the term "hidden" meaning that the interior surface is concealed and not visible when the first body component 102 is attached to the second body component 104. The exterior surface 110 of the first body component 102 has in part a desired aesthetic finish. More particularly, the exterior surface 110 can have a main exterior surface section 120 and a secondary exterior surface section(s) 122, wherein the main exterior surface section 120 is a show surface for the first body component 102 (i.e., the surface normally visible when the first body component is attached in the vehicle assembly) and has the desired aesthetic finish, for example, a "Class A" surface. The secondary exterior surface section(s) 122 of the first body component 102 is a surface not normally visible when the first body component is attached in the vehicle assembly and is commonly referred to as a "Class B" surface. The interior surface 112 has a main interior surface section 126 opposite the main exterior surface section 120 and a secondary interior surface section(s) 128 opposite the secondary exterior surface section(s) 122.

As used herein, a Class A surface is intended to refer to a surface that is visually decorative and smooth to the unaided eye or, in other words is visually free of unintentional distortions, such as sink marks, dimples, indents, divots, and the like. As is generally known in the vehicle art, unintentional distortions (e.g. sink marks or lines) can arise on the exterior surface of a plastic body component opposite an internal attachment structure for that body component. As such, achieving the desired Class A surface has often been the overriding factor in the placement of internal structures on molded plastic body components, as opposed to optimal positioning of such structures for increased strength and rigidity. In addition, a range of techniques may be used to manufacture the first and second body components 102, 104, in particular to achieve the desired Class A surface for the main exterior surface section 120 of the first body component 102. While any thermoplastic which is capable of being injection molded may be used for the first and second body components 102, 104, the selected thermoplastic should have the appropriate behavior and quality to achieve the desired aesthetic and performance characteristics.

According to the present disclosure, to prevent the unintentional distortions described above on the main exterior surface section 120 of the first body component 102, the first body component defines a first connecting portion 140 adapted for attachment to the second body component 104. In the depicted, the first connecting portion 140 has an attachment structure in the form of a rib 142 secured by the interior surface 112, wherein the connection of the rib 142 to the interior surface 112 is at an interior surface area that is not opposite the part of the exterior surface having the aesthetic finish. More particularly, the connection of the rib 142 to the interior surface is at an interior surface area other than the main interior surface section 126 that is opposite the main exterior surface section 120. In FIGS. 2-7, the first body component 102 is shaped such that the secondary interior surface section(s) 128 of the first connecting portion 140 includes a first interior surface section 146 and a second interior surface section 148 that faces the first interior surface section. The first interior surface section 146 can extend along one side edge of the main interior surface section 126 and the second interior surface section 148 can extend along another side edge of the main interior surface section 126. The rib 142 is extended between and secured to the first and second interior surface sections 146, 148. Further, the rib 142 is configured to extend in its length direction which is substantially perpendicular to a length direction of the main exterior surface section 120 so as to directly contact only the first and second interior surface sections 146, 148. Therefore, the rib 142 is spaced from the main interior surface section 126 that is opposite the main exterior surface section 120 having the aesthetic finish.

To further prevent the unintentional distortions on the secondary exterior surface section(s) 122, the rib 142 is formed with attachment extensions 160, 162 that directly secure the rib to the interior surface 112 of the first connecting portion 140. In the present embodiment, the attachment extension 160 is secured to the first interior surface section 146 and the attachment extension 162 is secured to the second interior surface section 148. The attachment extensions 160, 162 have a reduced thickness as compared to a thickness of a body 166 of the rib, and this reduced thickness can prevent the formation of sink marks or lines on the secondary exterior surface section(s) 122 of the first body component 102.

With continued reference to FIGS. 2-7, to secure the first body component 102 to the second body component 104 a second connecting portion 170 is extended outward from an exterior surface 172 of the second body component. The second connecting portion 170 includes a sidewall 176 and a base wall 178 to be attached to the rib 142. To minimize a gap between the first and second body components 102, 104 which provides for improved aesthetics of the vehicle assembly, the first body component 102 is configured to overlap the second connecting portion 170, such that an edge portion of the first connecting portion 140 is immediately adjacent the exterior surface 172. Further, to minimize movement and resulting rattle/vibration noise between the first and second connecting portions 140, 170, the sidewall 176 of the second connecting portion 170 has an outer surface shaped to substantially mate with a shape of the interior surface 112 of the first connecting portion. With the second connecting portion 170 properly received within the first connecting portion 140, the base wall 178 abuts the rib 142.

In the depicted aspect, the first and second connecting portions 140, 170 are adapted to be fastened to one another. To this end, the rib 142 has a first opening 184 formed therethrough, and the base wall 178 has a second opening 186 formed therethrough aligned with the first opening 184. A fastener 190 is inserted through the first and second openings 184, 186 from within the second connecting portion. In this manner, the fastener is hidden from view (i.e., a hidden fastener) and does not contact the main interior surface section 126 of the first body component 102 which can distort the main exterior surface section 120 with the aesthetic finish. The fastener 190 can be in the form of a push pin fastener where a first part 192 is inserted through the first and second openings 184, 186 and a second part 194 is press fit into the first part; although alternative fasteners known in the vehicle art can be used to secure the first and second connecting portions 140, 170.

Accordingly, the vehicle assembly 100 comprises the first body component 102 and the second body component. The first body component 102 has the exterior surface 110 and the interior hidden surface 112, where the exterior surface 110 has the main exterior surface section 120 with an aesthetic finish. The interior surface 112 has the main interior surface section 126 opposite the main exterior surface section 120. The first body component 102 defines the first connecting portion 140 having the rib 142 integral with the interior surface 112. The rib 142 is spaced from and not in contact with the main interior surface section 126. Without direct connection to the main interior surface section 126, there is no sink marks on the main exterior surface section 120. The rib 142 has the first opening 184 formed therethrough. The second body component 104 has the outward extended second connecting portion 170. The base wall 178 of the second connecting portion has the second opening 186 formed therethrough. The first connecting portion is configured to receive the second connecting portion with the base wall 178 abutting the rib 142 and the second opening aligned with the first opening. The fastener 190 is inserted through the first and second openings 184, 186 from within the second connecting portion. It should be appreciated that the arrangement of the first and second connecting portions 140, 170 described above can be implemented at various connection locations between the first and second body components 102, 104

As is evident from the forgoing, an exemplary vehicle assembly method is provided. The exemplary method comprises providing the plastic first body component 102 having the above described features; integrally forming the rib 142 on the first connecting portion 140 of the first body component 102 and spacing the rib from the main interior surface section 126 such that the rib is not in contact with the main interior surface section 126; providing the plastic second body component 104 having the above described features; positioning the base wall 178 of the second connecting portion 170 immediately adjacent the rib 142 such that the second opening 186 on the base wall 178 is aligned with the first opening 184 on the rib 142; and inserting the fastener 190 through the first and second openings from within the second connecting portion.

The exemplary vehicle assembly method further includes overlapping the second connecting portion 170 with the first connecting portion 140. The exemplary vehicle assembly method further includes forming the attachment extensions 160, 162 on the rib 142 to directly secure the rib to the interior surface 112 of the first connecting portion. The exemplary vehicle assembly method further includes forming the attachment extensions 160, 162 with a reduced thickness in an insertion direction of the fastener as compared to a thickness of the rib body 166 in the insertion direction. These low sink attachment extensions 160, 162 are located in a more desirable area outside the main interior surface section 126.

It will be appreciated that the above-disclosed and other features and functions, or alternatives or varieties thereof, may be desirably combined into many other different systems or applications. Any term of degree used herein, such as "substantially," means a reasonable amount of deviation of the modified word is contemplated such that the end result is not significantly changed. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
   a first body component with an exterior surface and an interior hidden surface, the exterior surface has in part an aesthetic finish, and the first body component defines a first connecting portion having a rib secured by the interior surface, the rib has a first opening formed therethrough;
   a second body component having an outward extended second connecting portion, a base wall of the second connecting portion has a second opening formed therethrough, the base wall abuts the rib with the second opening aligned with the first opening; and
   a fastener inserted through the first and second openings from within the second connecting portion,
   wherein the connection of the rib to the interior surface is at an interior surface area that is not opposite part of the exterior surface having the aesthetic finish.

2. The vehicle assembly of claim 1, wherein the aesthetic finish on part of the exterior surface of the first body component is a Class A surface.

3. The vehicle assembly of claim 1, wherein the interior surface of the first body component includes a first interior surface section and a second interior surface section that faces the first interior surface section, the rib extended between and secured to the first and second interior surface sections.

4. The vehicle assembly of claim 3, wherein the rib is configured to directly contact only the first and second interior surface sections, the rib spaced from an interior surface area that is opposite part of the exterior surface having the aesthetic finish.

5. The vehicle assembly of claim 3, wherein the extension of the rib between the first and second interior surface sections is in a length direction of the rib, and the length direction is substantially perpendicular to a length direction of part of the exterior surface having the aesthetic finish.

6. The vehicle assembly of claim 1, wherein the rib is formed with attachment extensions that directly secure the rib to the interior surface of the first connecting portion.

7. The vehicle assembly of claim 6, wherein the attachment extensions have a reduced thickness in an insertion direction of the fastener as compared to a thickness of a body of the rib in the insertion direction.

8. The vehicle assembly of claim 1, wherein the first connecting portion is configured to overlap the second connecting portion.

9. The vehicle assembly of claim 8, wherein the second connecting portion includes a sidewall with an outer surface shaped to substantially mate with the interior surface of the first connecting portion.

10. A vehicle assembly comprising:
    a first body component with an exterior surface and an interior hidden surface, the exterior surface has a main exterior surface section with an aesthetic finish, the interior surface has a main interior surface section opposite the main exterior surface section, the first body component defines a first connecting portion having a rib integral with the interior surface, wherein connection of the rib to the interior surface is at another interior surface section other than the main interior surface section such that the rib is spaced from and not in contact with the main interior surface section, the rib has a first opening formed therethrough;
    a second body component having an outward extended second connecting portion, a base wall of the second connecting portion has a second opening formed therethrough, the first connecting portion configured to receive the second connecting portion with the base wall abutting the rib and the second opening aligned with the first opening; and
    a fastener inserted through the first and second openings from within the second connecting portion.

11. The vehicle assembly of claim 10, wherein the interior surface of the first body component includes a first interior surface section and a second interior surface section facing the first interior surface section, the rib extended between and secured to the first and second interior surface sections.

12. The vehicle assembly of claim 11, wherein the rib is formed with attachment extensions that directly secure the rib to the first and second interior surface sections of the first connecting portion.

13. The vehicle assembly of claim 12, wherein the attachment extensions have a reduced thickness in an insertion direction of the fastener as compared to a thickness of a body of the rib in the insertion direction.

14. The vehicle assembly of claim 10, wherein the first connecting portion is configured to overlap the second connecting portion.

15. The vehicle assembly of claim 10, wherein the interior surface of the first body component includes a first interior surface section extended along one side edge of the main interior surface section and a second interior surface section extended along another side edge of the main interior surface section, the rib extended between and secured to the first and second interior surface sections.

16. A vehicle assembly method comprising:
    providing a plastic first body component, the first body component includes a first connecting portion having an exterior surface and an interior hidden surface, the exterior surface has a main exterior surface section with an aesthetic finish, the interior surface has a main interior surface section opposite the main exterior surface section;
    integrally forming a rib on the first connecting portion of the first body component, the rib has a first opening formed therethrough, and spacing the rib from the main interior surface section such that the rib is not connected to and not in contact with the main interior surface section;
    providing a plastic second body component having a second connecting portion extended outward from an exterior surface of the second body component, a base wall of the second connecting portion has a second opening formed therethrough;
    positioning the base wall immediately adjacent the rib such that the second opening is aligned with the first opening; and inserting a fastener through the first and second openings from within the second connecting portion.

17. The vehicle assembly method of claim 16, including overlapping the second connecting portion with the first connecting portion.

18. The vehicle assembly method of claim 16, including forming attachment extensions on the rib to directly secure the rib to the interior surface of the first connecting portion.

19. The vehicle assembly method of claim 18, forming the attachment extensions with a reduced thickness in an insertion direction of the fastener as compared to a thickness of a body of the rib in the insertion direction.

* * * * *